US008266248B2

(12) United States Patent
Belimpasakis et al.

(10) Patent No.: US 8,266,248 B2
(45) Date of Patent: Sep. 11, 2012

(54) USE OF NETWORK COMPOSITION DESCRIPTORS FOR DETERMINING PRODUCT COMPATIBILITY

(75) Inventors: Petros Belimpasakis, Tampere (FI); Seamus Peter Moloney, Riihimaki (FI)

(73) Assignee: Nokia Corporation, Espoo (FI)

( * ) Notice: Subject to any disclaimer, the term of this patent is extended or adjusted under 35 U.S.C. 154(b) by 400 days.

(21) Appl. No.: 12/082,525

(22) Filed: Apr. 11, 2008

(65) Prior Publication Data
US 2009/0259515 A1  Oct. 15, 2009

(51) Int. Cl.
*G06F 15/16* (2006.01)
(52) U.S. Cl. ..................... 709/218; 705/26.1
(58) Field of Classification Search .............. 709/218; 705/26
See application file for complete search history.

(56) References Cited

U.S. PATENT DOCUMENTS

| | | | | |
|---|---|---|---|---|
| 5,305,199 A | * | 4/1994 | LoBiondo et al. | 705/28 |
| 5,845,077 A | * | 12/1998 | Fawcett | 709/221 |
| 7,062,451 B1 | * | 6/2006 | Dentel et al. | 705/26 |
| 7,757,261 B2 | * | 7/2010 | Addington et al. | 725/114 |
| 8,103,259 B2 | * | 1/2012 | Gravel et al. | 455/414.2 |
| 2002/0023959 A1 | * | 2/2002 | Miller et al. | 235/462.13 |
| 2003/0195951 A1 | * | 10/2003 | Wittel et al. | 709/220 |
| 2004/0024835 A1 | * | 2/2004 | Howard | 709/213 |
| 2004/0260798 A1 | * | 12/2004 | Addington et al. | 709/223 |
| 2006/0190350 A1 | * | 8/2006 | Maas | 705/26 |
| 2006/0242030 A1 | * | 10/2006 | Blanchard et al. | 705/27 |
| 2006/0242036 A1 | * | 10/2006 | Walker et al. | 705/34 |
| 2008/0114861 A1 | * | 5/2008 | Gildred | 709/219 |
| 2008/0228503 A1 | * | 9/2008 | Buchheit | 705/1 |
| 2008/0242284 A1 | * | 10/2008 | Vechey et al. | 455/415 |

OTHER PUBLICATIONS

VUDU Product Information, printed from internet Apr. 10, 2008.
Gteko, GTWebCheck a Web-Based Support Platform, printed from internet Apr. 10, 2008.
Pure Networks, "Network Magic Essentials 4.6, Reviewer's Guide", Nov. 2007.

* cited by examiner

*Primary Examiner* — Mohamed Ibrahim
*Assistant Examiner* — Ninos Donabed
(74) *Attorney, Agent, or Firm* — Ditthavong Mori & Steiner, P.C.

(57) ABSTRACT

Using peer-to-peer device descriptors for determining product compatibility involves obtaining, via a home network, descriptors that describe a composition of the home network. The home network composition descriptors are compared to descriptors of products available from an e-commerce service provider that is external to the home network. The comparison determines compatibility of the products with the devices of the home network. Identity of compatible products selected from the products based on the comparison is communicated to a user.

23 Claims, 10 Drawing Sheets

USE OF NETWORK COMPOSITION DESCRIPTORS FOR DETERMINING PRODUCT COMPATIBILITY

FIELD OF THE INVENTION

This invention relates in general to computer networks, and more particularly to resource discovery in home networks.

BACKGROUND OF THE INVENTION

Universal Plug and Play (UPnP™) technology defines an architecture for pervasive peer-to-peer network connectivity of intelligent appliances, wireless devices, and PCs of all form factors. It is designed to bring easy-to-use, flexible, standards-based connectivity to ad-hoc or unmanaged networks whether in the home, in a small business, public spaces, or attached to the Internet. UPnP technology provides a distributed, open networking architecture that leverages Transmission Control Proto/Internet Protocol (TCP/IP) and the Web technologies to enable seamless proximity networking in addition to control and data transfer among networked devices.

The UPnP Device Architecture (UDA) is designed to support zero-configuration, "invisible" networking, and automatic discovery for a breadth of device categories from a wide range of vendors. This means a device can dynamically join a network, obtain an IP address, convey its capabilities, and learn about the presence and capabilities of other devices. UPnP uses the Simple Service Discovery Protocol (SSDP) for service discovery. SSDP is generally built on top of Internet Protocol (IP) based networks, and uses User Datagram Protocol (UDP) multicasts of eXtensible Markup Language (XML) formatted service descriptions.

Although UPnP is a well known example of a technology for establishing ad-hoc, peer-to-peer networks, it is not the only one. Another example is known as Bonjour provided in products by Apple™. Bonjour is Apple's trade name for its implementation of Zeroconf (standing for Zero Configuration Networking), which provides network formation and service discovery on a local area network. The Bonjour technology is widely used throughout Mac OS X™ and allows users to set up a network without any configuration. Currently it is used by Mac OS X (and other operating systems) to find printers and file sharing servers.

These ad-hoc, peer-to-peer technologies are used to form networks and discover services offered on the networks. Most service discovery, schemes provide a way to uniformly describe services available. In UPnP, this is known as the Description phase, and involves passing specially formatted extensible Markup Language (XML) documents that describe available devices and services. The descriptions may include vendor-specific device information like the model name and number, serial number, manufacturer name, URLs to vendor-specific web sites, etc.

The vendor-specific device data provided in device descriptions is usually informational, but may not be needed to ultimately use the device via the network. For example a Network Attached Storage (NAS) is a standalone, special purpose computer that serves as a network file server. Therefore, if service discovery determines that a NAS device supports a known protocol (e.g., Windows™ file sharing), then the model and serial number of the device may not be important to using the NAS.

Similarly, other useful technical data may be provided in the device description, such as that the device utilizes two Serial Advanced Technology Attachment (SATA) hard drives in a mirrored Redundant Arrays of Independent Disks (RAID) configuration, and can be configured to hold up to six hard drives. This information may be useful to some users, and may be available elsewhere (e.g., owner's manual). Nonetheless, most devices that access the device may reasonably ignore such information, as it does not affect the ultimate file server interactions with the NAS.

As home networked products become more ubiquitous, the selection of products compatible with those networks may become more difficult. When properly selected, devices that interact via ad-hoc, peer-to-peer networks can be set up and run more easily that traditional networking products. However, if the products are not strictly compatible with the specific ad-hoc, peer-to-peer protocols or network hardware, then such the benefits of this type of networking technology cannot be realized. There is benefit, then, in helping users to assure that a newly purchased product will be "out of the box" compatible with a home network.

SUMMARY OF THE INVENTION

To overcome limitations in the prior art described above, and to overcome other limitations that will become apparent upon reading and understanding the present specification, the present invention discloses a system, apparatus and method for determining product compatibility based on network composition descriptors. In one embodiment, a method involves obtaining, via a scanning component coupled to a home network, descriptors that describe a composition of the home network. The scanning component facilitates comparison of the home network composition descriptors to descriptors of products available from an e-commerce service provider that is external to the home network. The comparison determines compatibility of the products with the composition of the home network. An identity of compatible products selected from the products based on the comparison is communicated to the user.

In more particular embodiments, the home network composition descriptors describe at least one of devices, applications, application programming interfaces, and media file data types of the home network. In such a case, facilitating comparison of the home network composition descriptors involves facilitating comparison of the device descriptors and media file data type descriptors to the descriptors of products available from the e-commerce service provider.

In other more particular embodiments, the home network composition descriptors are obtained via a service discovery protocol of an ad-hoc, peer-to-peer network. In other arrangements, the scanning component may include a Web browser plug-in and/or a gateway of the home network. In the latter case, the home network composition descriptors may be obtained in response to a request for a scanning service directed to the service provider. In such case, the method further involves receiving, at the gateway in response to the request for the scanning service, a query for a home network location of the scanning component where the scanning service is accessed. The network location is provided from the gateway to the service provider in response to the query, and confirmation dialog is received from the service provider in response to the request for the scanning service. The confirmation dialog includes the network location where the scanning service is accessed. The network location is accessed via the confirmation dialog to initiate obtaining the home network composition descriptors.

In another more particular embodiment, facilitating comparison of the home network composition descriptors to the descriptors of the products involves communicating the home network composition descriptors to the service provider, and communicating the identity of the compatible products to the user comprises communicating a content page from the service provider to the user. In another case, facilitating comparison of the home network composition descriptors to descriptors of the product involves communicating the descriptors of the products to a device of the home network, and comparing the descriptors of the products with the home network composition descriptors at the device of the home network. In such a case, communicating the identity of the compatible products to the user may involve forming a content page at the device of the home network and communicating the content page to the user. The content page includes links to the service provider.

In another more particular embodiment, the method further involves requesting, via a browsing device, a scanning service via a content page of the service provider. A one-time-use, personal identification code is obtained from the service provider in response to the request for the scanning service. The personal identification code is entered into a mobile device that provides the scanning service. The mobile device obtains the home network composition descriptors. The home network composition descriptors and the personal identification code are communicated from the mobile device to the service provider, and the identity of the compatible products is associated with the personal identification code.

In another embodiment of the invention, an apparatus includes an internal network interface capable of connecting to a home network and a processor coupled to the internal network interface. Memory is coupled to the processor, and the memory includes instructions that cause the processor to: a) obtain, via the home network, descriptors that describe a composition of the home network; b) facilitate comparison of the home network composition descriptors to descriptors of products available from an e-commerce service provider that is external to the home network, wherein the comparison determines compatibility of the products with the devices of the home network; and c) communicate to a user an identity of compatible products selected from the products based on the comparison.

In another embodiment of the invention, an apparatus includes a network interface capable of connecting to at least one home network via the Internet. A processor is coupled to the network interface and memory is coupled to the processor, the memory includes instructions that cause the processor to: a) obtain, via the networking interface, descriptors that describe a composition of the home network; b) obtain descriptors of products offered for sale via an e-commerce Internet site; c) compare the home network composition descriptors to the descriptors of the products; d) determine compatibility of the products with devices of the home network based on the comparison; and e) communicate, to a user of the home network, an identity of compatible products selected from the products based on the determination of compatibility.

In more particular embodiments, the home network composition descriptors are obtained via a gateway of the home network in response to a request for a scanning service directed to the apparatus. The instructions further cause the processor to: f) send, to the gateway in response to the request for the scanning service, a query for a network location of the home network where the scanning service is accessed; g) embed the network location in a confirmation dialog; h) send the confirmation dialog to the user in response to the request for the scanning service; and i) obtain the home network composition descriptors in response to user activation of the dialog.

In another embodiment of the invention, system includes: a) means for obtaining descriptors that describe a composition of the home network; b) means for comparing the home network composition descriptors to descriptors of products available from an e-commerce service provider that is external to the home network; c) means for determining compatibility of the products with the devices of the home network; and d) means for communicating to the user an identity of compatible products selected from the products based on the determination of compatibility.

In a more particular embodiment, the system further includes: e) means for requesting a scanning service via a content page of the service provider; f) means for providing, to the e-commerce service provider, a network location of the home network where the scanning service is accessible; g) means for including the network location in a confirmation dialog that is sent to a user in response to a request for the scanning service. In such a case, obtaining the home network composition descriptors occurs in response to the request for the scanning service and is initiated via user selection of the confirmation dialog.

In another more particular embodiment, the system further includes: e) means for requesting a scanning service via a content page of the service provider; f) means for obtaining one-time use personal identification code response to the request for the scanning service; g) means for communicating the home network composition descriptors, and the personal identification code to the service provider in response to the request for the scanning service, wherein obtaining the home network composition descriptors occurs in response to the request for the scanning service; and h) means for associating the identity of the compatible products with the personal identification code.

In another embodiment of the invention, a computer readable storage medium has instructions stored thereon executable by a processor to: a) obtain, via a home network, descriptors that describe a composition of the home network; b) facilitate comparison of the home network composition descriptors to descriptors of products available from an e-commerce service provider that is external to the home network, wherein the comparison determines compatibility of the products with the devices of the home network; and c) communicate to a user the identity of compatible products selected from the products based on the comparison.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

Figure 1:
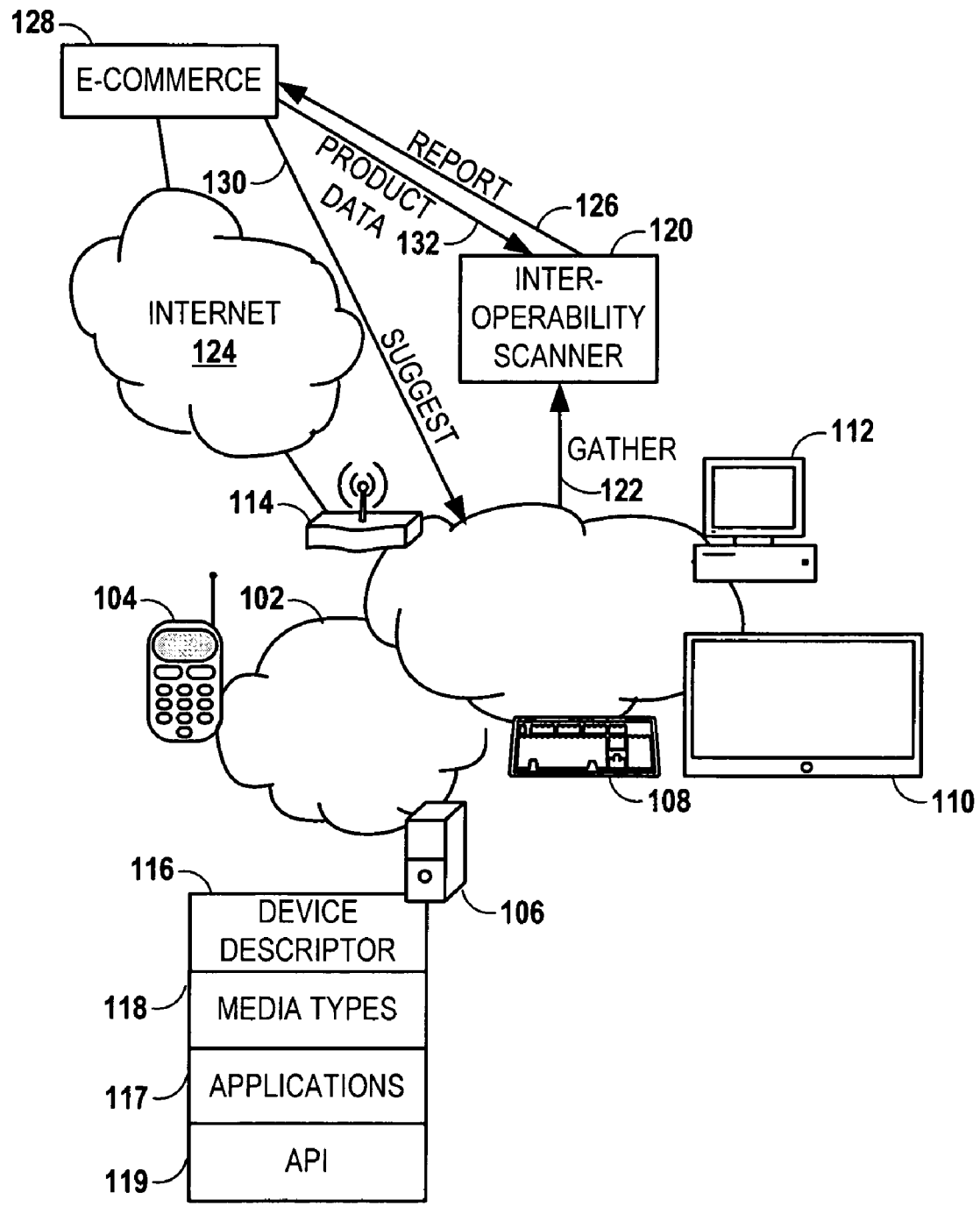
FIG. 1 is a block diagram illustrating a system according to embodiments of the invention.

In the following description of various embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present disclosure is related to automatically identifying and suggesting additional compatible electronic components based on network device, application, application program interface (API), and/or media descriptions. Such device and media descriptions may be sent, for example, as part of ad-hoc peer-to-peer network device discovery and service description. The service description data is compared against product data for which a user may be interested in, and recommendations can be provided based on this comparison.

The embodiments described herein may provide numerous advantages over labor-intensive examination and selection of items. As the number of device in users homes continues to grow, specific device and media data becomes hard to remember, and obtaining this data manually (e.g., going through user manuals or help screens) becomes increasingly cumbersome. A home network with the appropriate adaptations (e.g., peer-to-peer service discovery) can be automatically scanned for data that describes the devices and media used on these devices, thus relieving the users from this burden. The exemplary embodiments may also save the users a lot of time when looking for new devices, since automatic selection of products having known capabilities relieves the user from having to pore over huge lists of specifications. Another advantage to users is that such a system makes sure that the proposed device is compatible with existing home devices, thereby minimizing the chances for bad experiences when first using the new device.

The embodiments described herein also provide advantages for vendors and retailers. For the on-line shops, the solution offers an opportunity for providing more personalized services, thereby potentially attracting more customers. Although some users will have reservations about giving out data about their private networks, a properly designed and communicated security policy (e.g., user may need to authorize any data exported from the home network) will help minimize privacy concerns. Further, various embodiments allow such a recommendation to occur without any user device and media data from leaving the home network.

In some embodiments described herein, some of the data that characterizes product compatibility may be collected using service discovery mechanisms of ad-hoc, peer-to-peer networks. A widely implemented form of this network technology is UPnP, which is promoted by the UPnP Forum. The UPnP Forum promises transparent communication between any type of network-capable appliance, machine, or device. In many examples that follow, the use of UPnP and related technologies is illustrated with respect to audio-video (AV) components, although the concepts may apply equally to any type of apparatus.

As the UPnP standard developed, the use of UPnP for AV applications was seen as useful. As such, a UPnP AV specification was established that defines UPnP device architectures for AV devices. The UPnP AV specification includes UPnP device profiles that allow consumer electronics devices to distribute entertainment content throughout a home network.

The UPnP AV device profiles include a number of logical entities, including UPnP Media Server, UPnP Media Renderer, and UPnP Control Point. The Media Server has access to entertainment content, which may be located on a data store or a readable medium (e.g., disk drive, tape, or compact disc). The Media Server sends the entertainment content to one or more Media Renderers, which include hardware (e.g., displays, speakers) for rendering the content to a user. The Control Point coordinates the operation of the Media Server and Media Renderer to perform actions desired by the end-user. For example, the Control Point may query data available on the Media Server, allow a user to select content, and send a command that causes the Media Renderer to access and play the content.

The UPnP AV specifications don't specify any particular type of supported media. Generally, the devices are expected to exchange data that enables the devices to determine for themselves whether the particular media is supported. For example, a Media Server may specify that media is to be accessed using a Uniform Resource Identifier (URI) that specifies Hypertext Transport Protocol (HTTP) as a transport protocol. In such a case, an HTTP content type header, filename extension, and/or descriptors embedded in an XML document pointed to by the URI may provide indicators of content type.

A scanning component running on a network could collect device, application, API, and media-information from the home network using service discovery protocols and/or by other facilities of the home network (e.g., via Web, file, and application servers operating on the home network). The information collected may include, for example, the model of a Wireless Local Area Network (WLAN) access point, Internet connection speed, local network bandwidth/topology, model/version numbers of home devices that are UPnP or Bonjour capable (Media Renderers, Media Servers, Scanners, Printers, PCs, etc.), the mobile phones that the users have been using with a PC or other local device, the size of the media library of the user, types/codecs/digital rights management (DRM) attributes of the user's media (such as audio/video/picture) files.

If the software scanner component is executed on a particular device such as a personal computer (PC), or a mobile communication device, it could also get information about software installed on the PC (iTunes, Windows Media Player, etc.). Such a component may be able to determine firewall & connectivity settings based on the local settings of the device, or by using protocols such as Dynamic Host Configuration Protocol (DHCP), Simple Network Management Protocol (SNMP), etc. The data gathered in this way may provide a valuable insight into the current state and composition/configuration of the home network and resident devices, and therefore may be useful for adding new products, such as devices, applications, media files, and/or APIs to the network, or for replacing existing products.

For example, assume a user that wants to buy a new home device that will interface with the user's home network. The use has to be able to answer a few questions, before being able to choose the right product from a long list that an on-line store might offer. Examples of these questions include:

a) Which product (e.g., device, application, file, API) is best considering the network configuration, media files, applications, APIs, etc?

b) Should the product be compatible with wireless 802.11b/g/n networking, Ethernet, or something else?

c) Is the product compatible with my DivX or xVid files?

d) Is the product compatible with my iTunes video files?

e) How do I find out what files I have and what format are they in?

f) How does the product physically connect?

g) Are the connections of my TV compatible with the connections of the renderer and/or do I need an adapter?

h) Is it compatible with the Network Attached Storage Device I have already?

Depending on the technical expertise of the user, the user may not know the answers to all these questions. One approach to solve this problem is to define stricter interoperability guidelines such as exemplified by Digital Living Network Alliance (DLNA). The DNLA is intended to foster device compatibility by establishing interoperability certifications using open standards and widely available industry specifications. Nonetheless, some problems still exist with this approach. For example, there will always be those products that might be compatible with a user's home products, yet the product vendor does not obtain DLNA certification.

In other cases, leading-edge technologies may be available on the market well before a DLNA certification has been adopted for it. The leading-edge products may be able to advertise these new capabilities right out of the box, and information about new and compatible products may be available via the Internet. However, until the appropriate certifications are available, the user will have to gain some technical understanding of the new technology in order to make informed buying decisions. As a result, if a certification system such as DNLA becomes highly popular, it may impede the rate of initial adoption of new technologies by those users who have come to heavily rely on such certification.

Therefore, embodiments of the present inventions are directed to helping a non-technically savvy user choose the best device, such as from an on-line store. Of particular importance to such a user is whether such a new device will interact perfectly with his/her existing home devices and existing media files. Embodiments of the invention can help choose devices that may or may not conform to some particular industry interoperability standard, such as DLNA. However, it will be appreciated that some level of standardization may be assumed to ensure device compatibility. For example, terms such as 802.11g wireless networks, HTTP 1.0, MP3 variable bit rate (VBR), etc., may imply a level of conformance to a particular standard such that it may reasonably assumed devices advertising those capabilities will be compatible with each other.

In reference now to FIG. 1, a block diagram shows a system according to an embodiment of the invention. Generally, a local network 102 couples a number of computing apparatuses, such as mobile device 104 (such as a mobile communication device, audio/video player, digital camera/camcorder, positioning device, a game device, a mobile television, or any combination of the aforementioned), media server 106 (such as personal computer, server, set-top box, storage device, or digital video recorder), input device 108 (e.g., keyboard), media renderer 110 (e.g., television (TV), projector, audio player), personal computer (PC) 112, router/gateway/wireless access point 114, and sensors (such a movement, temperature, humidity, audio, still/video camera. The local network 102 may be suited for encompassing a physical space suitable for a home or small office application, as well as dealing with a (sometimes small) quantity of devices that might be seen in home or small business environment. Such a local network 102 may also be adaptable for use in other user environments, such as industrial computing/automation, vehicle/automotive computing or mobile/wearable computing. Additionally, the network 102 may comprise networks also in other locations such as in vehicles (such as cars or boats) and/or summer homes.

Devices coupled to the network 102 may utilize one or more protocols for service discovery. As described above, protocols associated with UPnP and/or Bonjour. Other wired and/or wireless protocols and technologies may also be adaptable to enable computing and non-computing devices to interoperate via the network, including Jini™, X10, Bluetooth, xAP, Rendezvous, HomeRF, IrDA, local area network (LAN), wireless LAN (WLAN), WiFi, ultra wide band (UWB), WiBree, etc. or any combination of the aforementioned. Generally, these protocols and technologies may make at least four types of data available, namely device descriptors 116, media types 118, applications 117, and APIs 119 as shown associated with media server 106.

The device descriptor data 116 may describe any combination of configurations, version, capabilities, services, and other relevant interoperability data related to associated device 106. For example, if the media server 106 is UPnP capable, it may be able to provide an SSDP service description of data access and storage capabilities of the server 106, thereby enabling other network devices to use these services. These service descriptions may include a description of multiple UPnP virtual devices that are included within a physical apparatus. For example, mobile device 104 may advertise both a user input device (e.g., UPnP control point) enabled by buttons/display of the device 104, as well as a media rendering device that is enabled by display/speakers in the device 104.

The media type data 118 may include data that describes formats and access protocol of user-rendered media, and this data 118 may be provided by way of a service of the associated device 106. For example, a UPnP media server may include a content directory service (CDS) that allows as user interface device (e.g., UPnP control point) to discover and enumerate all of the server's content. Other means may be used to discover media type data 118, such as by parsing file names using a network file service available on the target device 106 and/or by interrogated an API of a media rendering program. It will be appreciated that the media type data 118 provided by device 106 may include data that is not actually stored on the device 106. For example, the media server 106 may be capable of discovering and aggregating descriptions of media content available from multiple network devices. Thus the media server 106 may act as a central access point for media discovery, even though actual media access may occur elsewhere.

The network 102 is adapted to allow an interoperability scanner (device and/or application) 120 to gather 122 device descriptor data 116, media types 118, application data 117, and API data 119 from numerous devices of the network 102. The scanner 120 may be included one of the locally networked devices (e.g., mobile device 104, PC 112, or gateway 114), or may be remotely executed from a remote network via the Internet 124. The scanner 120 utilizes the network protocols and services that enable peer devices to access the relevant data 116, 118, albeit with a different focus. The scanner 120 gathers 122 the device, media, application and API data (116, 118, 117, 119) for purposes of determining a composition/profile of the network 102 and its devices, applications, APIs and media files so that additional, compatible devices, media, applications and/or APIs may be chosen.

In one arrangement, the scanner reports 126 this network profile data to an e-commerce Web server 128 or similar entity. The server 128 uses the report data 126 to determine suggestions 130 for devices that are compatible with the local network 102 and/or associated devices. In another arrangement, instead of reporting 126 the network profile data to the server 128, the server could instead send 132 relevant product data to the scanner 120. In this case, the scanner 120 could determine compatible products, and either suggest the products directly, or report 126 the suggestion to the server 128, which then suggests 130 the components to the user. The suggested components may be selected based further on user inputs that limit the applicability of the prospective purchase to a particular subset of devices.

For example, the user may control some aspect of the TV 110 or the set top box (not shown) using a wireless keyboard 108, and wishes to obtain a pointing device that cooperates with both devices. The keyboard 108 may have been chosen for the user (e.g., by a salesperson when the TV 110 was purchased) and thus the user may not know exactly how the keyboard 108 interacts with the TV 110. In this example, the gathered data 122 may include not only the protocol used by the keyboard 108 and TV 110, but may determine whether the keyboard 108 interacts directly with the TV 110 or via some other component such as a set top box. Thus, the user may be able to make a selection via a Web page associated with the e-commerce server 128 that states, in effect, "select a pointer/mouse that works with my TV in cooperation with the existing keyboard." This query along with the scanned and processed device/media reporting data 126 can be used to form a more accurate suggestion 130 for presentation to the end user.

Figure 2:
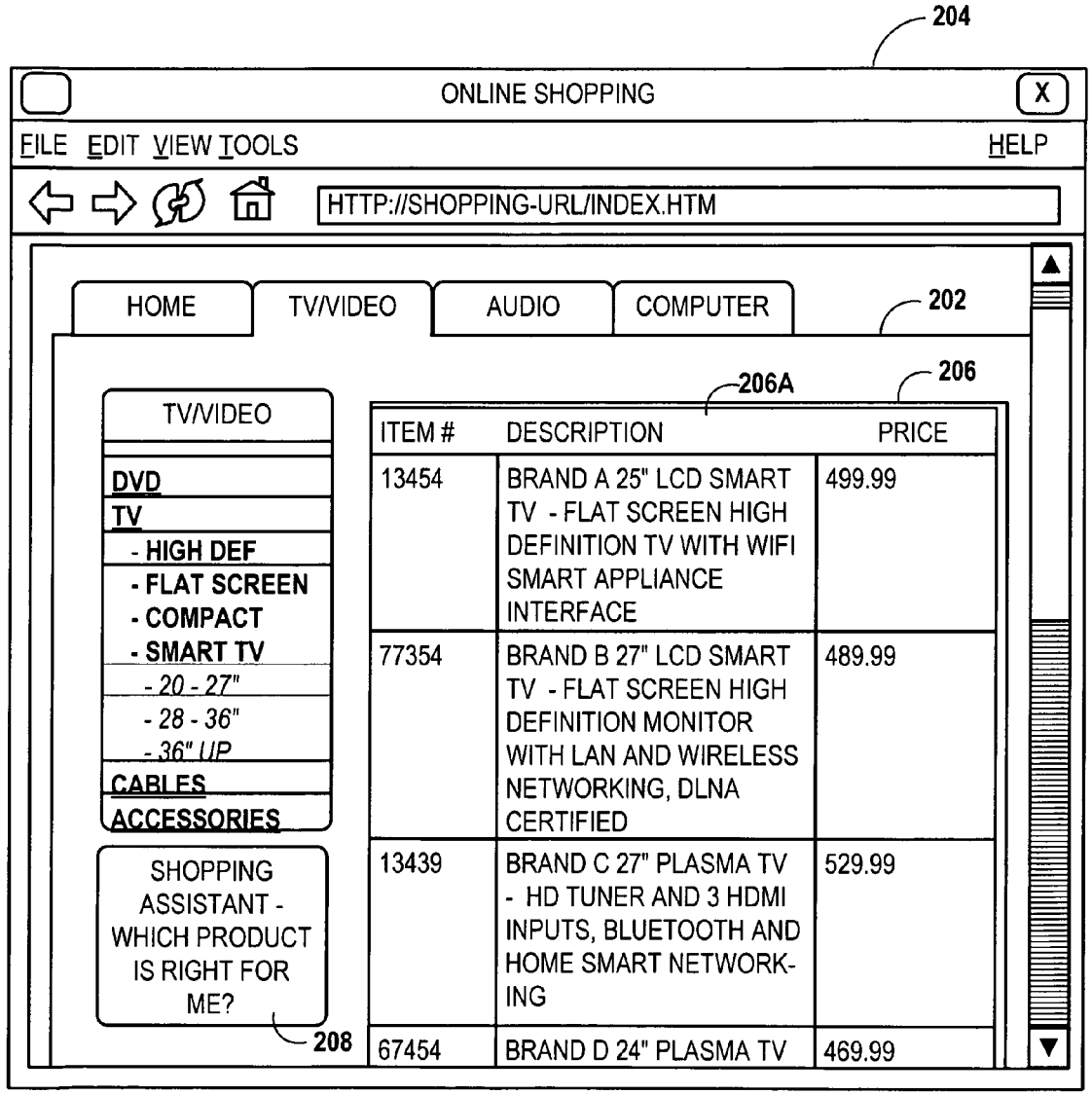
FIG. 2 is a user interface diagram illustrating an example e-commerce site according to an embodiment of the invention.

The scanner component 120 may be utilized at any time by the end user. The user may, for example, periodically gather 122 data for purposes besides purchasing products, such as inventory, auditing, and/or capturing a system configuration. However, it is envisioned that many users may utilize the scanner 120 as part of a transaction with an e-commerce service 128. As such, the component may be installed and/or activated by way of a Web page. In reference now to FIG. 2, a user interface screen 202 illustrates an example of a scanner component accessible via a Web interface according to an embodiment of the invention.

Generally, the interface screen may be accessed via the Internet using a browser program 204. The interface may be provided to the browser 204 as a document using protocols and formats that are well known in the art. In this example, the interface 202 of an electronics retailer Web page, and includes a listing 206 of various products, in this example TVs. The listing 206 includes a column 206A with a short description for each TV, and selecting an item in the listing may lead the viewer to a page devoted to that item, which may include detailed specifications, pictures, ratings, etc.

Although the short description 206A is usually useful, it may not provide enough detail to enable the user to determine if the TV is compatible with existing equipment. For example, if it is assumed that some of the TVs may be UPnP compatible, but the short descriptions 206A may use trade names or differing nomenclatures (e.g., smart appliance, home smart network) to identify this feature. Therefore, the user may have to select each item in the list to determine whether a given product is advertised as UPnP capable, that is assuming that the user actually knows that UPnP is what he or she needs, or whether an alternate networking technology might also be used in this situation Accordingly, the user interface 202 includes a control 208 to assist the user in selecting between the displayed products. This control 208 may be in the form of any combination of a browser plug-in, locally running software, or software running externally from the home network (e.g., from an Internet server). Generally, the control 208 can initiate (with the user's consent) scanning of their local network to determine a network-wide device, media, application and/or API interoperability profile. The browser 204 may be operating on a device that has access to that local network, either by way of physical connection or external access (e.g., virtual private network). In such a case, a plug-in would have direct access to the network. It will be appreciated, though, that the browser 204 may be operating on a device outside the network. In such a case, the control 208 may still be able to work, although there may need to be provisions for accessing the network at least for the scanning function, such as via Network Address Translation (NAT) pass-through or Virtual Private Network (VPN).

Figure 3:
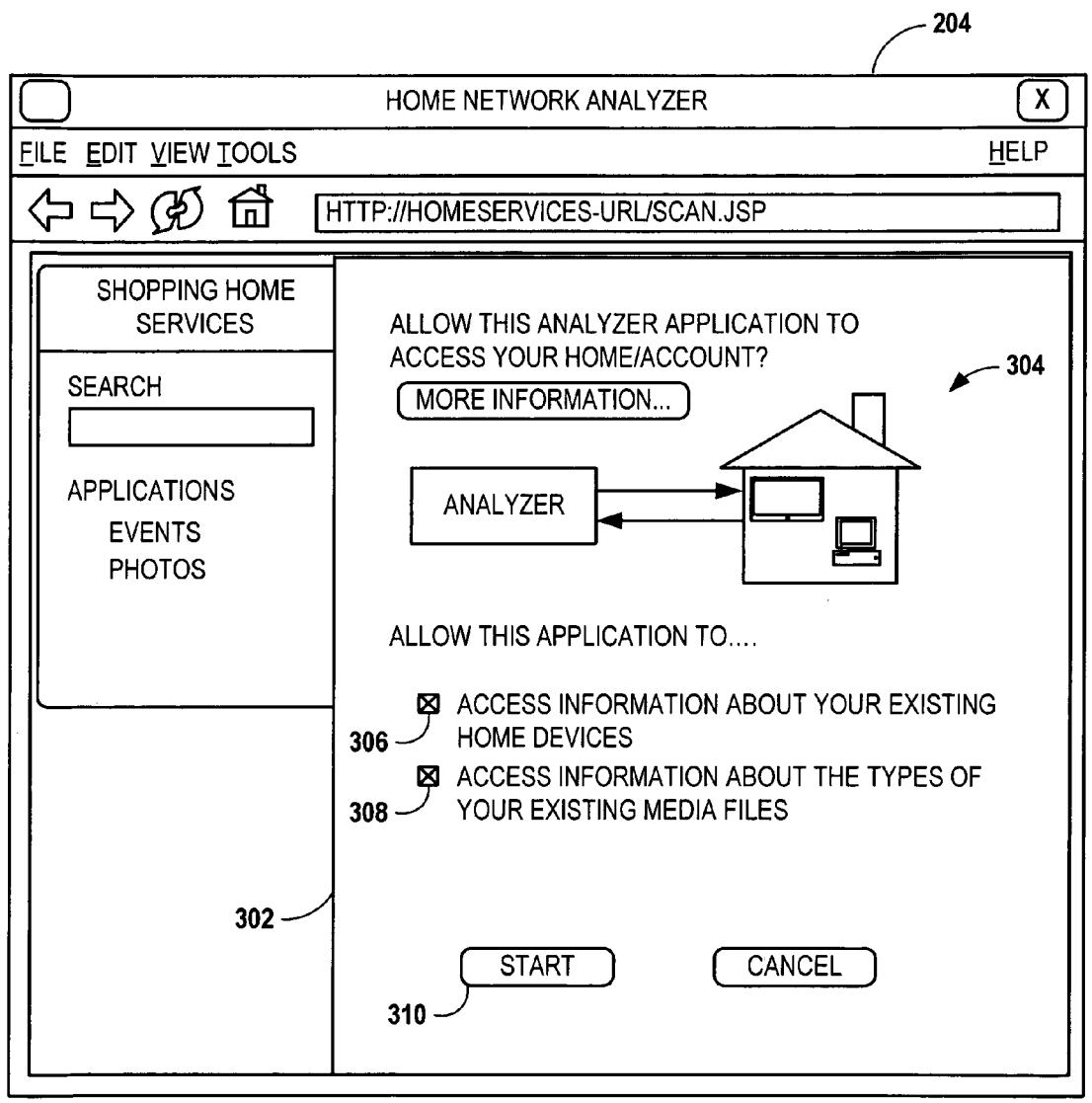
FIG. 3 is a user interface diagram illustrating an example network scanner interface according to an embodiment of the invention

If the user has selected the control 208, a user interface may be provided that assists in completing the scanning process. An example of a scanning assistant screen 302 according to an embodiment of the invention is shown in FIG. 3. In this example, the screen 302 is shown in the same browser 204 where the control 208 was selected, although a different program/device may be used to show the interface screen 302. The screen 302 includes an explanation portion 304 that informs the user of what is to occur, as well as selection boxes 306, 308 that allow the user to allow one or more of device data access, media type access, application type access and/or API type access. If acceptable, the user can activate the scanning process by way of the "start" control 310.

Figure 4:
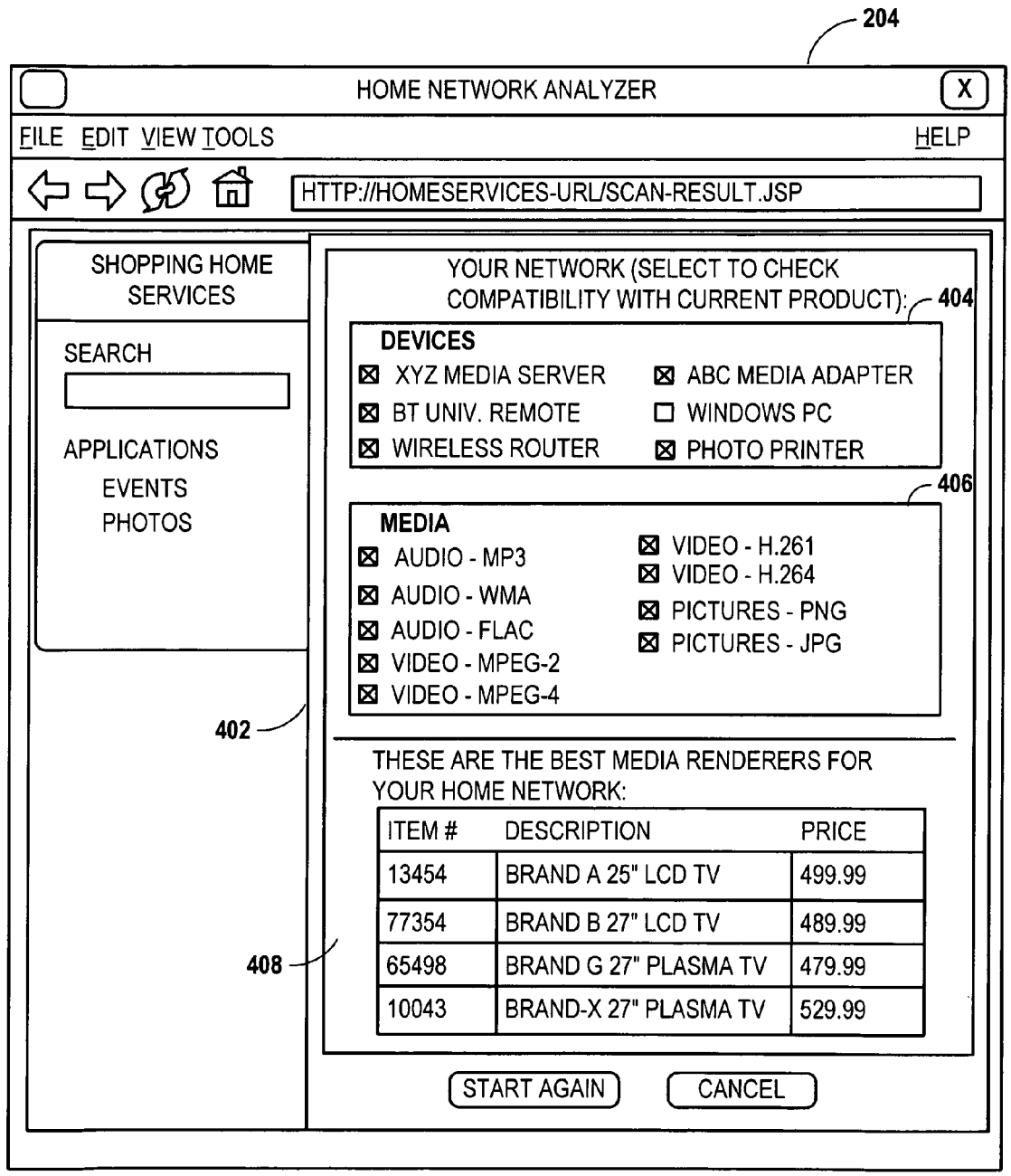
FIG. 4 is a user interface diagram illustrating example recommendations according to an embodiment of the invention.

If the user has selected the start control 310, a user interface may be provided that shows the result of the scanning process and applies those results to the products available at the vendor's Web site. An example of a scanning result screen 402 according to an embodiment of the invention is shown in FIG. 4. In this example, the screen 402 is shown in the same browser 204 where the control 310 was selected. The screen 402 includes scan results portions 404, 406 that informs the user of what was discovered regarding respective device and media types. The user may be able to select and deselect various items within these portions 404, 406. This ability to select particular media types and devices may prevent an overly strict limitation on the results, particularly for devices or media for which the user does not care about compatibility.

The screen 402 includes a recommendation portion 408 which lists available products that are compatible with the devices and media types selected in sections 404, 406. It will be appreciated that in many cases there could be varying levels of compatibility, such as where one product is seen as compatible with all of the device interfaces and/or media types of the local network, whereas other products may be partially compatible (e.g., incompatible with a small subset of the features). As such, the results 408 may be ordered or ranked based on level of compatibility, and links (not shown) may be used to analyze incompatibilities and select/deselect those features for which compatibility is more or less important.

The recommendations 408 may be further tailored using techniques known in that art, such as sorting and filtering based on aspects unrelated to compatibility. For example, the recommendations 408 could be limited to a particular price range before or after the scan took place. Selecting an item from the recommendations 408 may activate a link that leads to a detailed page for a particular product, with data such as pictures, owner's manuals, ratings, etc. The Web site may include other product-related objects that can interact with the home network functionality exposed by the scanner. For example, the Web page for some products may have a computer executable object (e.g., a Java Applet) that simulates a product's functionality. In such a case, the user can try out functions such as on-screen menus, and see how the simulator interacts with the identified devices 404 and media 406. While such a simulator may not be able to determine physical compatibility with the home network, it can provide, for example, indications of software compatibility and ease of use.

As previously indicated, a scanning component according to embodiments of the invention may run on locally or remotely located apparatuses. In reference now to FIG. 5, a sequence diagram illustrates a device and media scanning procedure according to an embodiment of the invention. In this scenario, a home network environment 500 includes scanning software that may run, for example, on a fixed computing component such as a home server or a user device 510. The home network environment 500 includes coupled home device 506, 508, and user device 510. Although two devices 506, 508 are shown, it will be appreciated that the concepts described herein can be extended to any number of devices that may be expected to be used in the home domain 500. The user device 510 has a user interface and software such as a browser that provides user access to an externally located (e.g., Internet based) online shop 502.

The home network 500 may refer to any collection of networked devices that are located in one or more physical spaces, such as homes, small businesses, industrial environment, vehicles, or any combination of the aforementioned. Access to remote entities such as the online shop 502 may be provided via an Internet Service Provider (ISP) and accessed by way of a gateway/router (not shown). In this example, the user device 510 visits 512 a Web site of the online shop, and triggers a request 514 for the scanning, such as by activation of a Web page object. This request is directed to the scanning software 504, by a direct connection from the online shop 502, redirection by the user device 510, or interception by an intermediary such as home gateway. In one embodiment, the scanning software 504 may exist as a plug-in to a browser of the user device 510. In such a case, an additional step (not shown) of downloading and installing the plug-in may occur before the request is received 514 and processed.

Before scanning commences, authorization by the user 510 may be requested 516. Assuming that the user confirms 518 that the scan is allowed, the software component 504 begins scanning 520, 522 devices 506, 508, respectively. The scanning 520, 522 may include the sending of queries, such a UPnP m-search messages. In response, the requested device and/or media descriptors are gathered 524, 526 by the scanning software 504, which compiles 528 the data into a format usable by external entities such as the online shop. It will be appreciated that the gathering of data 524, 526 may occur at any time, including before the scan is requested 514. The gathering 524, 526 may also include obtaining data that was not specifically requested 520, 522, such as broadcast/multicast service advertisements.

There may be advantages to regularly scanning 520, 522, gathering 524, 526, and compiling 528 the device and media data. For example, pre-compiled and cached data may include data from devices that are presently turned off when the request 514 is sent. In some arrangements, the scanning software 504 may be resident on a device that already performs such characterization of the network devices 506, 508 for other purposes. For example, a home UPnP device may already perform scanning 520, 522 and/or gathering 524, 526 in order to interact with other UPnP devices. In such a case, the software may need only to access the existing data gathered by a UPnP module, and create the compilation 528 out of that data.

The compilation 528 (comprising device, media file, application and API data) may include any combination of parsing, reformatting, data reduction (e.g., removing redundant or irrelevant data), etc. For example, the software 504 can remove any privacy data that might be used to indicate user identity, such as network service set identifiers (SSID), hostnames, usernames, etc. Similarly, any media data collected should be devoid of any identification of content (i.e. metadata), but only provide indications of format and access protocols. Once prepared, the compiled data (or composition data) 528 is sent as a device/media profile 530 to the online shop 502 in response to the request 514.

The online shop 502 can perform a number of operations 532 with the received device/media data 530, such as parsing, retrieving product data from a database, comparing parsed data against product data, analyzing the results to select the optimum choice. These operations 532 result in forming suggestions 536 which are provided to the user 510 in order to carry on further transactions, such as queries/purchases 538.

Although the provided profile data 530 can be used to further the immediate goals of providing suggestions 536, it will be appreciated that the data 530 has other uses, for example improving the existing models for device compatibility. This is shown as database update 534. One use of the profiles 530 is that it may provide valuable data about compatibility between the user's existing devices (e.g., devices 506, 508). For example, if a number of home networks report devices X and Y on the same network, and devices X and Y have complementary functions (e.g., Control Point and Media Server) then it may be assumed that these devices are satisfactorily compatible. Other data might also suggest this compatibility. For example if a Control Point could enumerate the Media Servers and Media Renderers with which it interacts, then this may be another positive indication of compatibility.

Another measure of compatibility of which the users and vendors may be interested is the success rate of the recommendations 536 and subsequent purchase requests 538, as represented by feedback 540. The feedback 540 could be tracked by non-network events, such as product returns based on incompatibility. However, once the purchased device is installed in the home network 500, the new device may be able to interact with the scanning software 504 and/or online shop 502 to at least report successful installation and interaction with other devices 506, 508. The feedback 540 may also indicate errors that occur that provide evidence of total or partial incompatibility.

Figure 5:
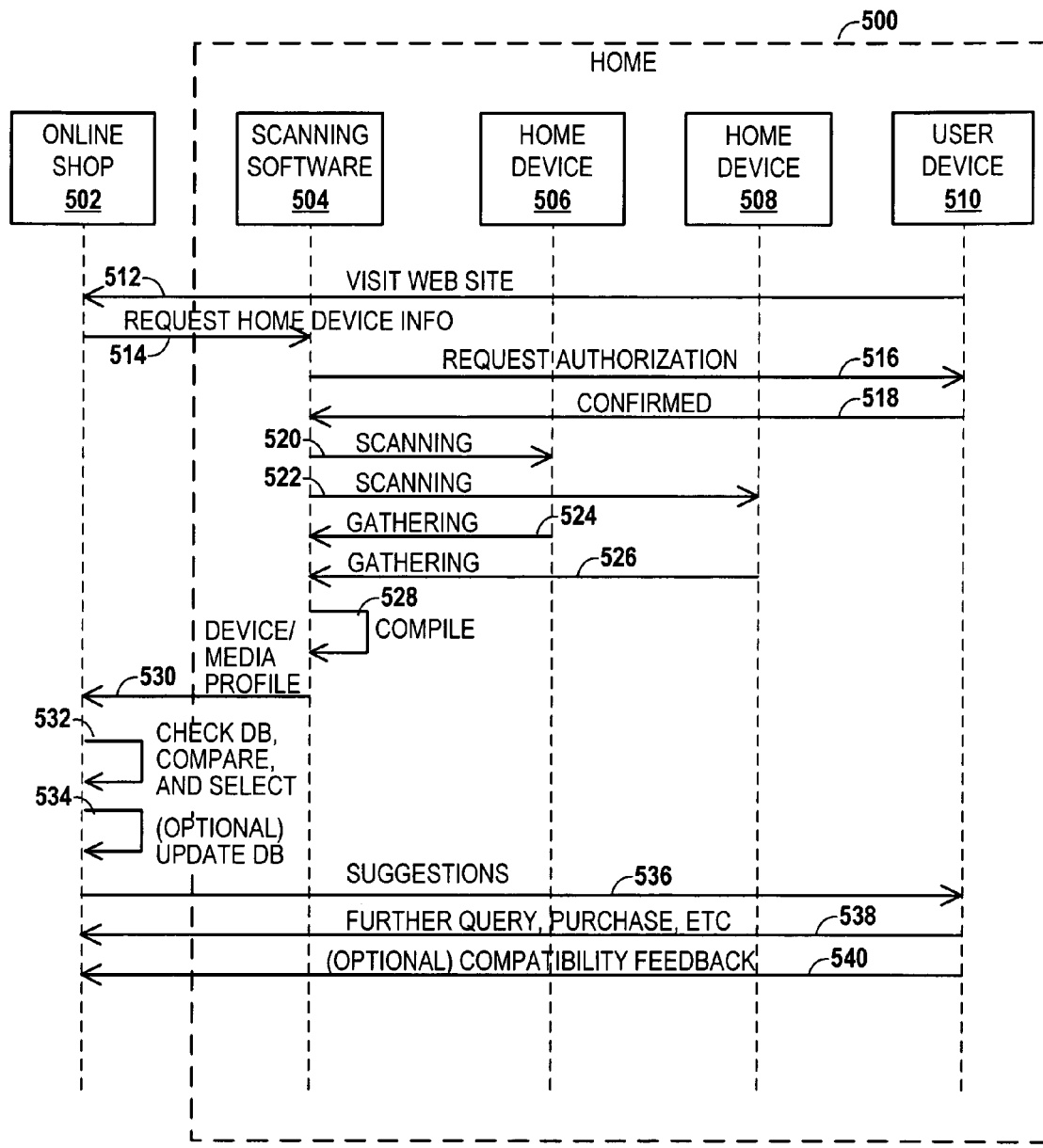
FIGS. 5-7 are sequence diagrams illustrating scanning interactions according to various embodiments of the invention.
Figure 6:
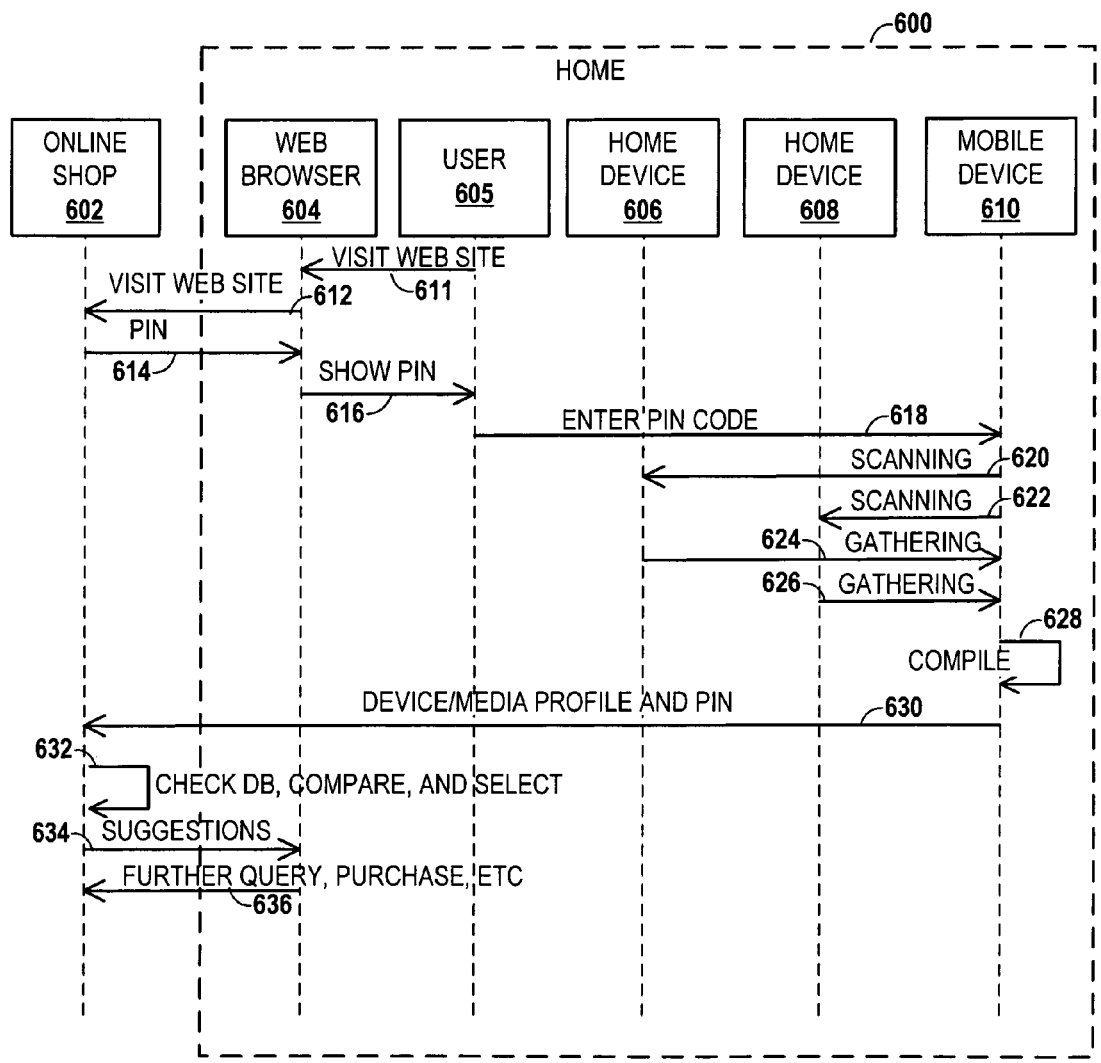

In reference now to FIG. 6, an alternate scenario is illustrated for new product compatibility scanning according to an embodiment of the invention. Similar to the scenario shown in FIG. 5, a home environment 600 in FIG. 6 contains a number of home devices 606, 608 and mobile device 610 with scanning software (e.g., similar to software 504 in FIG. 5) installed. The user 605 interacts 611 with an online shop 602 via a Web browser 604. Although the browser 604 is shown operating within the home network environment 600, it may not need to operate in the home. In this configuration, the browser 604 does not need to access the other devices 606, 608 of the network 600. Instead, when a user 605 visits 612 the Web site of the online shop 602, a personal identification number (PIN) 614 is provided to the browser 604, which displays 616 the PIN to the user 605. The PIN 614 may be a one-time usage code (e.g., (e.g., 2323244@verkkokauppa.com) to be entered to the scanning software of the mobile device 610. This example PIN code contains the shop Internet address, and a specific transaction ID.

The user 605 enters the PIN 618 into the mobile device 610, either contemporaneously with the Web site visit 612 or sometime thereafter. The mobile device 610 may have an application launcher that starts the scanning program, and the PIN is entered 618 into the scanner program via a user interface. In response, the mobile device scans 620, 622 the local environment, gathers 624, 626 relevant device/media data, compiles 628 the data and reports 630 the data to the online shop. These actions may be performed substantially as described in relation to FIG. 5, except that the reported data 630 will include the PIN and thereafter be associated with the PIN. Alternatively, the web browser 604 may be included in the mobile device 610, and the PIN code may be transferred automatically to the scanner program after the user has approved the scanning.

Similar to the scenario shown in FIG. 5, the online shop 602 analyzes 632 the device/media data and provides suggestions 634, to which the user can respond 636 further with queries, purchases, etc. It should be apparent that there could be a time discontinuity between the Web site visit 612 and the provision of suggestion 634, because of the independent intervening actions of the mobile terminal 610. As such, the online shop 602 may maintain an account associated with the PIN (or other access data) that allows the user to access the shop 602 to view suggestions 634 in a different session than the original visit 612. If this is a vendor that the user often uses, there may be some advantage to storing and updated the device profiles 630 to assist the user in future purchases, as well as acting as a convenient entry point for all information relating to the user devices, such as software updates, warranty information, user manuals, configuration backups, etc.

Figure 7:
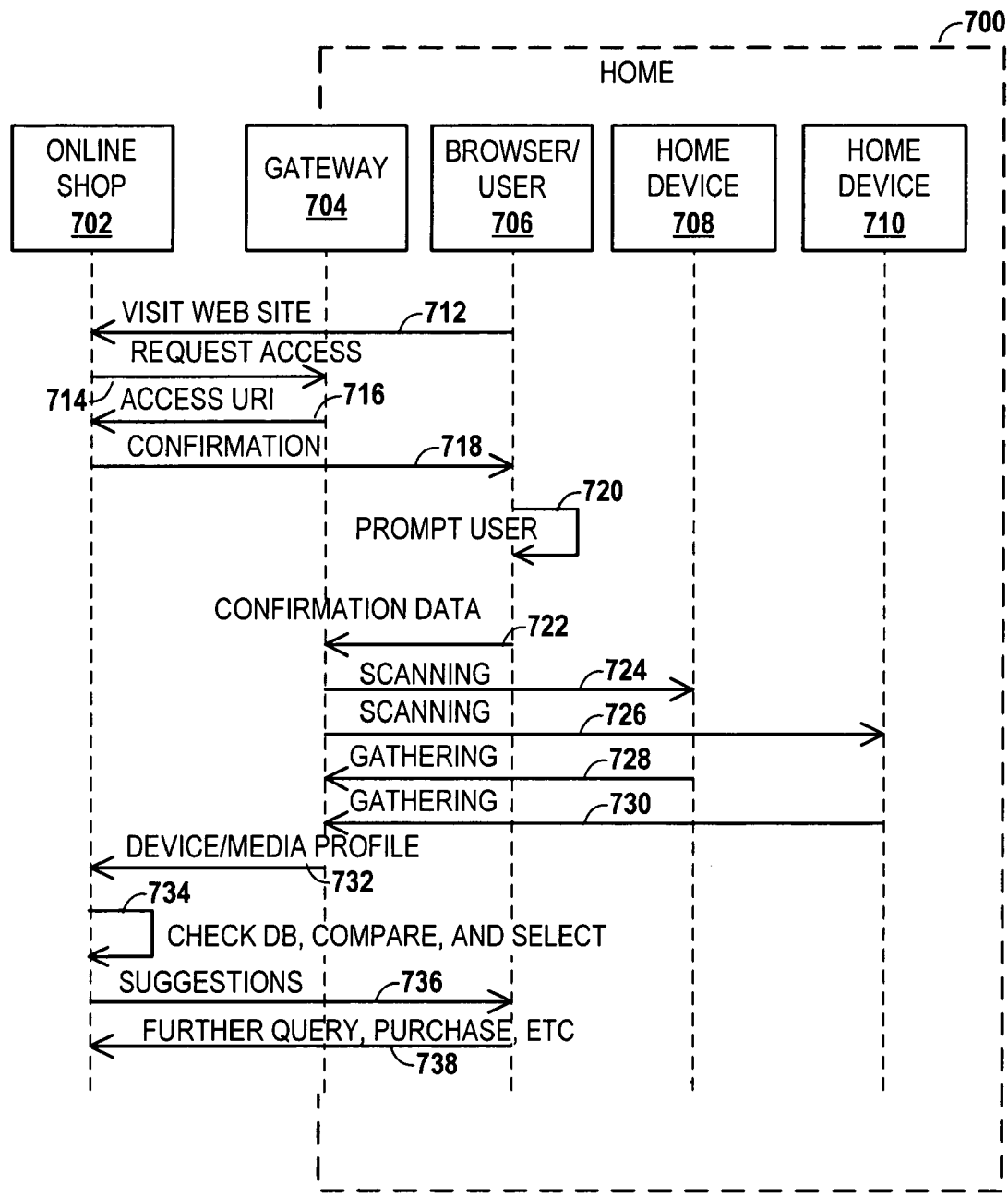

In reference now to FIG. 7, an alternate scenario is illustrated for new product compatibility scanning according to an embodiment of the invention. Similar to the scenario shown in FIGS. 5 and 6, a home environment 700 in FIG. 7 contains a number of home devices 708, 710 and a user accessible browser 706. In this example, the local network environment 700 includes a gateway 704 that assists in network scanning on behalf of an online shop 702. The gateway 704 (or some other local device) may run the scanning software (e.g., similar to software 504 in FIG. 5). In another arrangement, the gateway 704 may facilitate access to the network 700 by scanning software running on a server of the online shop 702.

The user interacts 712 with the online shop 702 via the browser 706. Based on a user interaction 714 with the Web site, the online shop can obtain the public IP address of the home gateway 704 (e.g., looking at TCP/IP headers of request 712). The shop 702 may try to contact 714 the home gateway 704 on a well known port, for example to determine if the gateway 704 supports the special scanning procedure, and to request scanning rights. In response, the home gateway 704 provides a Uniform Resource Identifier (URI) 716 to the on-line store 702. The URI links to the private scanning page of the home GW (e.g. http://192.168.1.1/scan). This URI need not be accessible from the on-line store, so long as it is accessible on the local network 700. In this example the IP address 192.168.1.1 of the URI is a non-Internet routable address that may be used on a home network where Internet access is provided by a NAT gateway.

The on-line store 702 embeds the URI into a confirmation Web page 718, which may be displayed via the user's browser 706, e.g., as a pop-up window. This pop-up window will contain the URI to the internal address of the gateway, or some other local device. The user confirms 720 the prompt via the pop-up window, thereby giving his confirmation for scanning the home network 700. The prompt 720 may just include a confirmation (e.g., yes/no) and/or could include a request for access data (e.g., password or PIN) used to authenticate with the gateway 704. This prompting 720 procedure may be done for security reasons, so that no external entity can scan the network, without user's clear acknowledgement.

In response, to successfully prompting 720 of the user, the browser passes the confirmation 722 to the gateway 704. The gateway 704 then commences with scanning 724, 726 and/or gathering 728, 730 to obtain data from devices 708, 710. Thereafter, the device media profile 732 is provided to the online shop 702 after local compilation (not shown) by the gateway 704.

In another embodiment of this sequence, the actual scanning 724, 726 and/or gathering 728, 730 may be performed by the online shop 702 by way of the gateway 704. In such a case, the user prompt 720 is for purposes of opening up the gateway 704 for temporary access by the server 702. This approach may be seen as less desirable by some users because it gives an external entity 702 access to the local network 700, where security measures may be lax or nonexistent due to dependence on the gateway 704 as a firewall. Nonetheless, this configuration offers some advantages, as the online shop 702 is more likely to include up to date software and device definitions. To alleviate some concerns, the gateway 704 may be configured with software that closely monitors the actions taken and data retrieved by the shop 702.

It will be appreciated there may be alternate approaches to those shown in FIGS. 5-7 that will yield similar results. For example, referring again to FIG. 5, instead of the scanning software 504 sending 530 the device/media data to the online shop 502, the shop could instead send to the scanning software 504 a specially formatted database of all products available via the shop, or at least those products relevant to the current request 514. In such a case, the operations of checking the database 532 and providing suggestions 536 may be performed partially or wholly by the scanning software 504 or some other device of the home environment 500. For example, a suggestion page 402 such as seen in FIG. 4 could be generated locally by the scanner 504, and that page 402 could contain links for accessing the appropriate data from the shop 502 when further inquiries 538 are performed. The procedures in FIGS. 6 and 7 could be similarly modified. Additionally, the process steps between the embodiments in FIGS. 5-7 may be combined in any combinations and order.

As described above, a scanning software component that gathers compatibility data can run either on a locally attached network device or remotely. In reference now to FIG. 8, a block diagram illustrates an apparatus 800 that, in one embodiment of the invention, that may perform any combination of local or remote scanning functions. The apparatus 800 may include a processor 802, memory 804, and an I/O bus 806 that couples peripheral devices to the processor 802. Those peripheral devices may include persistent memory storage 808 (e.g., disc drives, flash memory), one or more network interfaces 812, and a media reader 810 (e.g., tape reader, floppy drive, Compact Disc player, Digital Versatile Disc player, memory card reader, etc.). The media reader 810 is capable of reading from a storage medium 814, such as optical or magnetic media. The media reader 810 may also be capable of writing to the media 814. The network interfaces 812 may be capable of communicating via one or more networks 816 and the Internet 124. The network 816 may utilize such media such as phone lines, coaxial cable, Ethernet, wireless radio transmissions, infrared transmissions, etc. The network 816 may include Internet Protocol (IP) based public and private networks, as well as proximity networking such as Bluetooth, WLAN, UWB, WiBree, and IrDA.

The operation of the processor 802 is dictated by instructions 818 that may be stored temporarily or permanently in memory 804 or other logic circuitry. The instructions 818 may be built into to the apparatus 800 during manufacture, or may be later transferred to the apparatus 800 via the storage media 814 or the networks 816. The instructions 818 may include one or more P2P protocol discovery modules 820 for facilitating gathering device descriptor and/or media data from other devices 822 of the network 816. One or more alternate discovery protocols 824 may also be used to discover device/media data. The alternate discovery protocols 824 may include search using client-server protocols (e.g., HTTP, network file servers, etc.), network management protocols such as SNMP, etc. The discovery protocols 820, 824 may rely on a standard networking protocol stack 826 for common network protocols such as TCP/IP, UDP/IP, etc. The network protocol stack 826 in turn utilizes the network interface 812 for accessing the network(s) 816, 124.

The instructions 818 include a data gathering module 828 that coordinates gathering the device and media data via the discovery modules 820, 824. The gathered data is sent to a compiling module 830 that processes the gathered data into a format usable by a target e-commerce service 832. As will be described in greater detail below, the e-commerce service 832 is adapted to received device data 834 and media data 836 that is gathered and prepared by the apparatus 800. This data 834, 836 maybe temporarily or permanently stored on the device 800, and may be in a raw format provided by the gathering module 828 or in a compiled format output from the compiling module 830. The output of the compilation module 830 may be more compact than a raw format, e.g., having been subject to compilation operations such as reformatting, removal of redundant or unnecessary information, removal/hiding of privacy data, etc.

The e-commerce service 832 is operable with a wide variety of home environments and device platforms. As such, it may be beneficial for a compilation module 830 to provide a consistent format regardless of the underlying discovery mechanisms 820, 824, network protocols 826, and platform of devices 800, 822. As such, a publicly accessible schema 838 may be capable of ensuring that the compiler 830 provides the data 834, 836 in an acceptable and consistent form. The schema 838 can be maintained independently of e-commerce services 832 and end users. In such a case, the e-commerce server 832 may also access the schema 838 to prepare device and media data that describes the vendor's products.

The instructions 818 include a reporting module 840 that communicates the gathered data 834, 836 to the e-commerce server 832. The reporting module 840 may "push" the data out to a network server, or may act as a server and wait for an external entity (e.g., the e-commerce server 832) to "pull" the needed data. The reporting module 840 may use a standardized protocol for reporting the data, such as the use of a Web services interface (not shown) of the e-commerce service 832 or some intermediary service. A Web service is defined by the World Wide Web Consortium (W3C) as a software system designed to support interoperable machine-to-machine interaction over a network. Web services are frequently Web APIs that can be accessed as a remote procedure call over a network, such as the Internet 124. The remote procedure call is executed on a remote system hosting the requested service.

It will be appreciated that users of the network(s) 816 may wish the data 834, 836 to be reported only on an informed and voluntary basis. Therefore, the instructions 818 may include provisions to ensure that the actions of such components as the gathering and reporting modules 828, 840 operate only in response to an authenticated user request. As such, the apparatus 800 may maintain authentication data 842 that is referenced before certain operations are performed. For example, a user interface that enables a scan by the gathering module 828 may present a password dialog to ensure that an authorized user is initiating the scan. This password can be checked via the authentication data 842. Similarly, there may need to be an authentication of the e-commerce server 832 before sending gathered data via the reporting module 840 to protect against address spoofing or man-in-the-middle attacks. The authentication storage 842 can be used to manage locally or remotely generated authorization codes, such as the PIN described in relation to FIG. 6.

In response to the sending of data 834, 836 to the e-commerce service 832, the apparatus 800 may facilitate reporting recommendations to the user based on greatest compatibility with the data 834, 836. These recommendations may be shown elsewhere (e.g., in a browser operating on another apparatus, where the scanning was initiated from that other apparatus). The apparatus 800 may also be involved in generation/display of recommendations, as represented by recommendation module 846. For example, where the instructions 818 are part of a browser plug-in, the recommendations could be provided from the e-commerce service 832 and be displayed on the browser GUI. However, if the apparatus 800 is acting as an intermediary between the e-commerce service 832 and a user device, the recommendations module 846 may itself dynamically generate the recommendations, and send those to the user device.

The apparatus 800 may include a device locally or remotely situated relative to target network(s) 816. For example, the instructions 818 could be included as part of a browser plug-in operating on a user's desktop, portable computer, or mobile device. The apparatus 800 could be configured as an infrastructure service device, such as a network switch, router, gateway, access point, proxy server, etc. As the operation of the instructions 818 may include exchanging data with a remote service 832, the instructions 818 may include a gateway access module 844 that governs access to networks(s) 816 by external entities to facilitate actions related, for example, to local gathering and/or reporting of the target data 834, 836.

In an alternate embodiment of the invention, the components of apparatus 800 may be configured such that the e-commerce service 832 does not collect the data 834, 836, but instead the service 832 sends a database of product information to the apparatus, and a component of the apparatus, represented as comparison module 848, may perform the selection of optimum or near-optimum products. In such a case, the results may be provided via recommendation module 846, and/or may be sent to e-commerce service 832 via reporting module 840 for further processing.

As described above, a scanning software component gathers compatibility data for purposes of determining compatibility with commerce sold on an Internet site. In reference now to FIG. 9, a block diagram illustrates an apparatus 900 that may perform any combination of e-commerce server according to embodiments of the invention. The apparatus 900 may include a processor 902, memory 904, and an I/O bus 906 that couples peripheral devices to the processor 902. Those peripheral devices may include persistent memory storage 908, one or more network interfaces 912, and a media reader 910. The media reader 910 is capable of reading from a storage medium 914. The media reader 910 may also be capable of writing to the media 914. The network interfaces 912 may be capable of communicating via one or the Internet 124 in order to communicate with home networks 916. The networks 916 are generally small-scale private networks, as well as proximity networking such as Bluetooth and IrDA.

The operation of the processor 902 is dictated by instructions 918 that may be stored temporarily or permanently in memory 904 or other logic circuitry. The instructions 918 may be built into to the apparatus 900 during manufacture, or may be later transferred to the apparatus 900 via the storage media 914 or the networks 916. The instructions 918 may include one or more networking protocol stacks 920 for common network protocols such as TCP/IP, UDP/IP, etc. The network protocol stack 926 in turn utilizes the network interface 912 for accessing the networks 916, 124.

The instructions 918 include a store front module 922 that provides the shopping experience to the users. The store front module 922 may include a standard HTTP server that provides static or dynamic HTML documents. The store front 922 may also be enabled to directly or indirectly offer a scanner Web object 924 (e.g., browser plug-in, standalone software, etc.) to users of the store front 922. The scanner Web object 924 may scan the local networks 916 as described in greater detail elsewhere herein. The scanner object 924 (or other remotely situated software) may interact with a data gathering module 926 that coordinates gathering device and media data from individual user networks 916. The gathered data may be stored as user data 928 and compared to product data 930 via a comparison module 932. The output of the comparison module 932 may include recommendations 934 that are selected from the product data 930.

The scanner objects 924 may be configured so that the device and media data 928 is gathered in a format already compatible with the product data 930. As previously mentioned regarding FIG. 8, an external schema 838 may positively specify these formats. The scanner objects 924 may also enforce some local and external authentication mechanisms to prevent unauthorized scanning and/or gathering at the networks 916. The local components (e.g., gathering module 926) may securely store authentication data that facilitates these secure transactions.

In alternate embodiment of the invention, the components of apparatus 900 may be configured such that the apparatus 900 accesses the networks 916 itself, and authentication data 936 is used to temporarily gain access through network firewalls and the like. In such an arrangement, the gathering component 926 may include modules for communicating via various service discovery protocols and appropriately extracting and formatting data so obtained. In yet another embodiment, the product data 930 (or a subset thereof) is instead sent to the networks 916 for local comparison and recommendation. In such a case, some form of the results (e.g., the compatible products selected from the product data 930) may still be reported via the gathering module 926 for internal tracking, etc.

Figure 8:
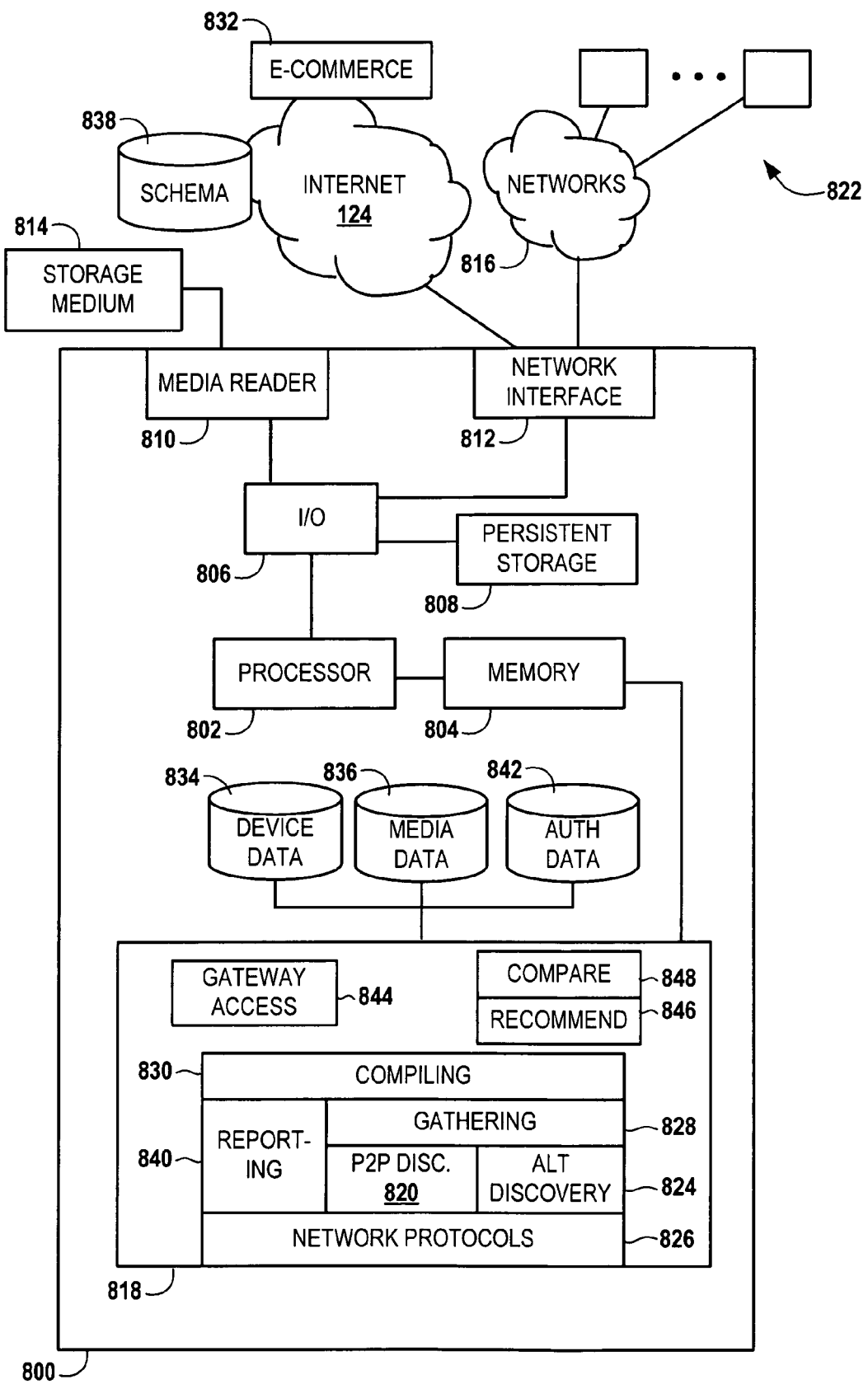
FIG. 8 is a block diagram of a local network apparatus according to an embodiment of the invention.
Figure 9:
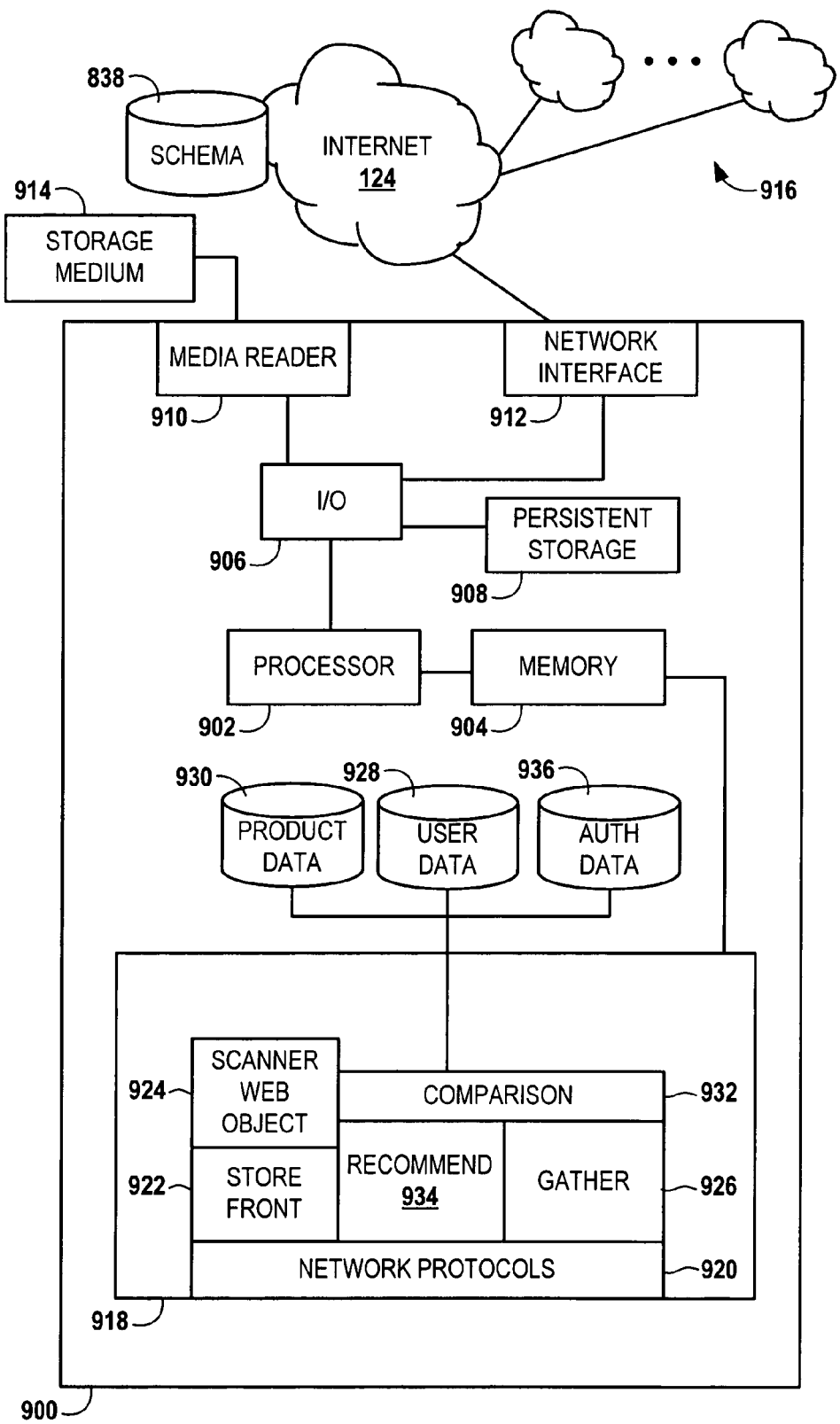
FIG. 9 is a block diagram of a e-commerce server apparatus according to an embodiment of the invention.

The apparatuses 800, 900 in FIGS. 8 and 9 may include other well-known features that are not illustrated, such as user input devices, user output devices, power circuitry, sensors, etc. As will be appreciated by one of skill in the art, an apparatus having the functions described herein may include a combination of two or more physical devices that are at least coupled via some data transfer medium to form a distributed computing arrangement. In other arrangements, the functions of various components represented by computing instructions 818, 918 can be separated to operate via dependently or independently operating computing arrangements coupled by networks. For example, each function of service discovery 820, 824, gathering 828, compiling 830 and reporting 840 shown in FIG. 8 can each be separately implemented in physically dispersed apparatus that intercommunicate as described herein, but otherwise operate independently of each other.

Figure 10:
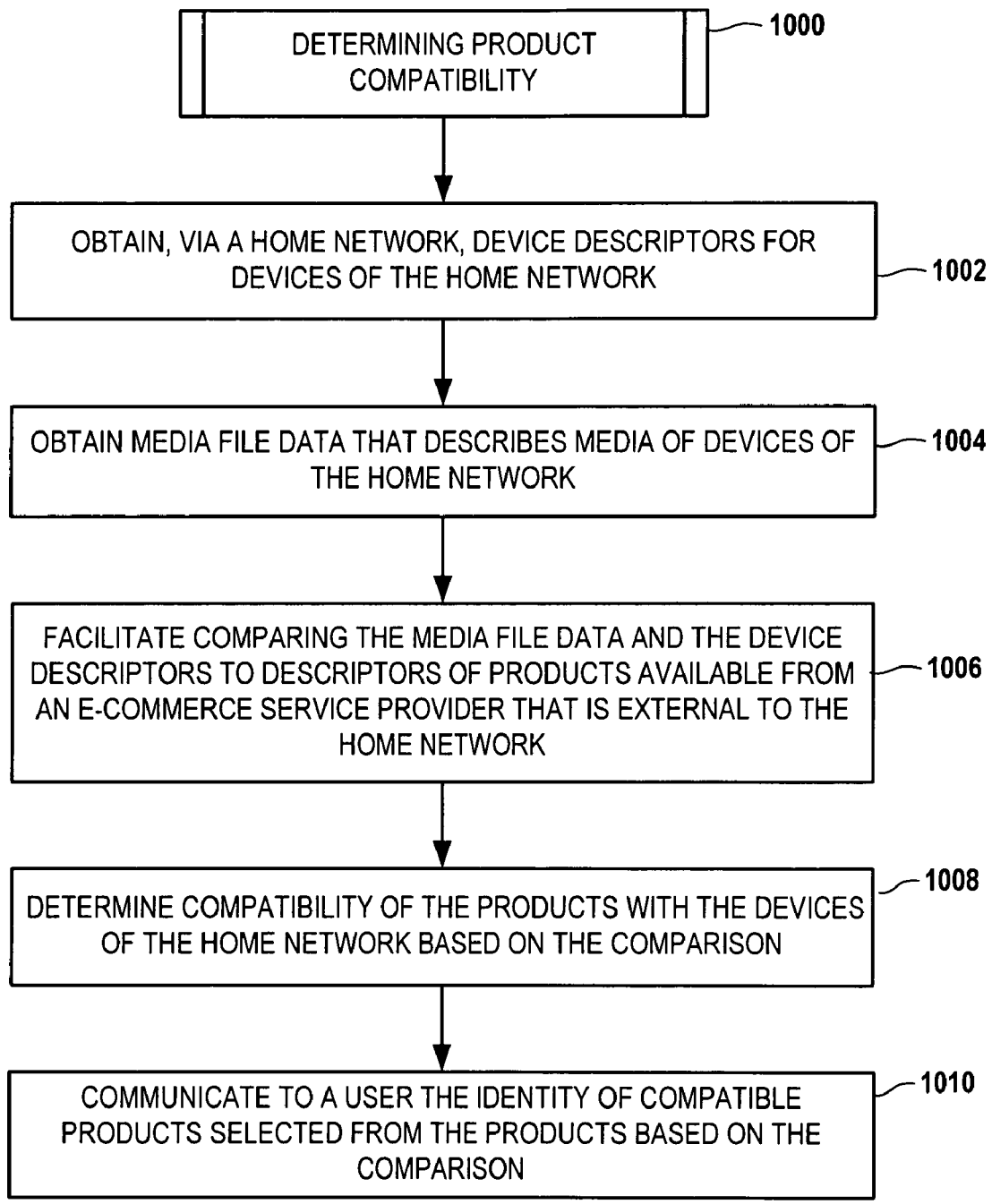
FIG. 10 is a flowchart describing procedures according to an embodiment of the invention.

In reference now to FIG. 10, a flowchart illustrates a procedure 1000 for determining product compatibility. The procedure 1000 involves obtaining 1002, via a peer-to-peer home network, device descriptors for devices of the home network. Media file data that describes media of devices of the home network is also obtained 1004. Comparison 1006 of the media file data and the device descriptors to descriptors of products available from an e-commerce service provider that is external to the home network is facilitated. This comparison 1006 may occur locally or remotely. The comparison 1006 is used to determine 1008 compatibility of the products with the devices of the home network. An identity of compatible products selected from the products based on the comparison is communicated 1010 to a user.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:

receiving, at a gateway of a home network in response to a request for a scanning service, a query for a home network location of a scanning component where the scanning service is accessed;

determining to provide from the gateway to an e-commerce service provider, the network location in response to the query;

receiving a confirmation dialog from the service provider in response to the request for the scanning service, wherein the confirmation dialog includes the network location where the scanning service is accessed;

determining to access the network location via the confirmation dialog to initiate obtaining descriptors that describe a composition of the home network;

determining to obtain, via the scanning component coupled to the home network, the home network composition descriptors, wherein the home network composition descriptors are obtained in response to the request for the scanning service directed to the service provider;

determining to obtain, via the scanning component, media file data that describes media of one or more devices of the home network, wherein the scanning component comprises the gateway;

determining to facilitate, via the scanning component, comparison of the home network composition descriptors to descriptors of products available from the service provider, wherein the comparison determines compatibility of the products with the composition of the home network and the gateway assists in scanning on behalf of the service provider; and determining to communicate to a user an identity of compatible products selected from the products based on the comparison, wherein the determination to obtain descriptors comprises sending queries over the home network to the one or more devices and gathering the descriptors over the home network from the one or more devices.

2. The method of claim 1, wherein the home network composition descriptors describe at least one of devices, applications, application programming interfaces, and media file data types of the home network.

3. The method of claim 2, wherein the determination to facilitate comparison of the home network composition descriptors comprises facilitating comparison of the device descriptors and media file data type descriptors to the descriptors of products available from the e-commerce service provider.

4. The method of claim 1, wherein the home network composition descriptors are obtained via a service discovery protocol of an ad-hoc, peer-to-peer network.

5. The method of claim 1, wherein the scanning component comprises a Web browser plug-in.

6. The method of claim 1, wherein the determination to facilitate comparison of the home network composition descriptors to the descriptors of the products comprises communicating the home network composition descriptors to the service provider, and wherein determining to communicate the identity of the compatible products to the user comprises communicating a content page from the service provider to the user.

7. The method of claim 1, wherein the determination to facilitate comparison of the home network composition descriptors to descriptors of the product comprises:
communicating the descriptors of the products to a device of the home network; and
comparing the descriptors of the products with the home network composition descriptors at the device of the home network.

8. The method of claim 7, wherein the determination to communicate the identity of the compatible products to the user comprises forming a content page at the device of the home network and communicating the content page to the user, wherein the content page comprises links to the service provider.

9. The method of claim 1, further comprising:
determining to request, via a browsing device, a scanning service via a content page of the service provider;
determining to obtain, a one-time-use, personal identification code from the service provider in response to the request for the scanning service;
determining to enter the personal identification code into a mobile device that provides the scanning service, wherein the mobile device obtains the home network composition descriptors;
determining to communicate the home network composition descriptors and the personal identification code from the mobile device to the service provider; and
determining to associate the identity of the compatible products with the personal identification code.

10. An apparatus comprising:
at least one processor; and
at least one memory including computer program code,
the at least one memory and the computer program code configured to, with the at least one processor, cause the apparatus to perform at least the following:
receive, at an external network interface in response to the request for the scanning service, a query for a network location of a home network where the scanning service is accessed,
determine to provide to the service provider the network location in response to the query;
receive a confirmation dialog from the service provider in response to the request for the scanning service, wherein the confirmation dialog includes the network location where the scanning service is accessed;
determine to facilitate accessing the network location in response to user activation of the confirmation dialog;
determine to obtain, via the home network, descriptors that describe a composition of the home network, wherein accessing the network location initiates the obtaining of the home network composition descriptors;
determine to obtain, via the home network, media file data that describes media of one or more devices of the home network, wherein the home network composition descriptors are obtained in response to a request for a scanning service directed to the service provider;
determine to facilitate comparison of the home network composition descriptors to descriptors of products available from an e-commerce service provider, wherein the comparison determines compatibility of the products with the devices of the home network; and
determine to communicate to a user an identity of compatible products selected from the products based on the comparison,
wherein the determination to obtain descriptors comprises sending queries over the home network to the one or more devices and gathering the descriptors over the home network from the one or more devices.

11. The apparatus of claim 10, wherein the apparatus further comprises the external network interface is coupled to the processor, the network location comprises an address of an internal network interface, and the apparatus acts as an internet gateway of the home network, and the apparatus is further caused to:
determine to forward a confirmation dialog from the service provider to a user in response to the request for the scanning service, wherein the confirmation dialog includes the network location where the scanning service is accessed.

12. The apparatus of claim 10, wherein the home network composition descriptors describe at least one of devices, applications, application programming interfaces, and media file data types of the home network.

13. The apparatus of claim 10, wherein the home network comprises an ad-hoc, peer-to-peer network, and wherein the home network composition descriptors are obtained via a service discovery protocol of the ad-hoc, peer-to-peer network.

14. The apparatus of claim 10, wherein the determination to facilitate comparison of the home network composition descriptors to descriptors of the product comprises:
communicating the home network composition descriptors to the service provider, and
wherein communicating the identity of the compatible products to the user comprises communicating a content page from the service provider to the user.

15. The apparatus of claim 10, wherein the determination to facilitate comparison of the home network composition descriptors to descriptors of the product comprises:
receiving the product data at the apparatus; and
comparing the product data with the home network composition descriptors at the apparatus.

16. The apparatus of claim 15, wherein the determination to communicate the identity of the compatible products to the user comprises forming a content page at the apparatus and communicating the content page to the user, wherein the content page comprises links to the service provider.

17. The apparatus of claim 10, wherein the apparatus further comprises a user interface, the apparatus is further caused to:
- receive a one-time-use personal identification code via the user interface, wherein the personal identification code is obtained from the service provider in response to a request for the scanning service via a browsing device that accesses a content page of the service provider; and
- determine to communicate the home network composition descriptors and the personal identification code to the service provider, wherein the identity of the compatible products are associated with the personal identification code.

18. An apparatus comprising:
at least one processor; and
at least one memory including computer program instructions,
the at least one memory and the computer program instructions configured to, with the at least one processor, cause the apparatus to perform at least the following:
- receive, at a gateway of at least one home network in response to a request for a scanning service, a query for a home network location of a networking interface where the scanning service is accessed;
- determine to provide from the gateway to an e-commerce service provider, the network location in response to the query;
- receive a confirmation dialog from the service provider in response to the request for the scanning service, wherein the confirmation dialog includes the network location where the scanning service is accessed;
- determine to access the network location via the confirmation dialog to initiate obtaining descriptors that describe a composition of the at least one home network;
- determine to obtain, via the networking interface, the home network composition descriptors, wherein the home network composition descriptors are obtained in response to the request for the scanning service directed to the service provider;
- determine to obtain, via the networking interface, media file data that describes media of one or more devices of the at least one home network;
- determine to obtain descriptors of products offered for sale via an e-commerce Internet site;
- determine to compare the home network composition descriptors to the descriptors of the products;
- determine compatibility of the products with devices of the home network based on the comparison; and
- determine to communicate, to a user of the home network, an identity of compatible products selected from the products based on the determination of compatibility,
wherein the determination to obtain descriptors comprises sending queries over the home network to the one or more devices and gathering the descriptors over the home network from the one or more devices.

19. The apparatus of claim 18, wherein the home network composition descriptors are obtained via the gateway in response to a request for a scanning service directed to the apparatus, and wherein the apparatus is further caused to:
- determine to send, to the gateway in response to the request for the scanning service, a query for a network location of the home network where the scanning service is accessed;
- determine to embed the network location in a confirmation dialog;
- determine to send the confirmation dialog to the user in response to the request for the scanning service; and
- determine to obtain the home network composition descriptors in response to user activation of the dialog.

20. A system comprising:
means for receiving, in response to a request for a scanning service, a query for a home network location;
means for determining to provide, in response to the query, the network location to an e-commerce service provider that is external to the home network;
means for receiving a confirmation dialog from the service provider in response to the request for the scanning service, wherein the confirmation dialog includes the network location where the scanning service is accessed;
means for determining to access the network location via the confirmation dialog to initiate obtaining descriptors that describe a composition of the home network;
means for obtaining the home network composition descriptors, wherein the home network descriptors are obtained in response to the request for a scanning service directed to the service provider;
means for obtaining media file data that describes media of one or more devices of the home network;
means for comparing the home network composition descriptors to descriptors of products available from the e-commerce service provider;
means for determining compatibility of the products with devices of the home network; and
means for communicating to a user an identity of compatible products selected from the products based on the determination of compatibility,
wherein the determination to obtain descriptors comprises means for sending queries over the home network to the one or more devices and means for gathering the descriptors over the home network from the one or more devices.

21. The system of claim 20, further comprising:
means for requesting a scanning service via a content page of the service provider;
means for providing, to the e-commerce service provider, a network location of the home network where the scanning service is accessible;
means for including the network location in a confirmation dialog that is sent to a user in response to a request for the scanning service; and
wherein obtaining the home network composition descriptors is initiated via user selection of the confirmation dialog.

22. The system of claim 20, further comprising
means for requesting a scanning service via a content page of the service provider;
means for obtaining one-time use personal identification code response to the request for the scanning service;
means for communicating the home network composition descriptors, and the personal identification code to the service provider in response to the request for the scanning service, and
means for associating the identity of the compatible products with the personal identification code.

23. A non-transitory computer readable storage medium carrying one or more instructions which, when executed by one or more processors, cause an apparatus to at least perform the following steps:

receive, at a gateway of a home network in response to a request for a scanning service, a query for a home network location of a scanning component where the scanning service is accessed;

determine to provide from the gateway to an e-commerce service provider that is external to the home network, the network location in response to the query;

receive a confirmation dialog from the e-commerce service provider in response to the request for the scanning service, wherein the confirmation dialog includes the network location where the scanning service is accessed;

determine to access the network location via the confirmation dialog to initiate obtaining descriptors that describe a composition of the home network;

determine to obtain, via the home network, the home network composition descriptors, wherein the home network composition descriptors are obtained in response to the request for the scanning service directed to the e-commerce service provider;

determine to obtain, via the home network, media file data that describes media of one or more devices of the home network, wherein the scanning component comprises the gateway;

determine to facilitate comparison of the home network composition descriptors to descriptors of products available from the e-commerce service provider that is external to the home network, wherein the comparison determines compatibility of the products with the devices of the home network and the gateway assists in scanning on behalf of the e-commerce service provider; and determine to communicate to a user the identity of compatible products selected from the products based on the comparison, wherein the determination to obtain descriptors comprises sending queries over the home network to the one or more devices and gathering the descriptors over the home network from the one or more devices.

\* \* \* \* \*